United States Patent [19]

Dowrick et al.

[11] Patent Number: 4,577,786
[45] Date of Patent: Mar. 25, 1986

[54] PANNIER BAG HAVING A CLAMPING DEVICE WITH LOCKING MEMBER

[75] Inventors: David C. Dowrick, Boulder; Edward K. Hine, Jr., Louisville; Gregory S. Hine, Boulder, all of Colo.

[73] Assignee: Hine-Snowbridge, Inc., Boulder, Colo.

[21] Appl. No.: 630,645

[22] Filed: Jul. 13, 1984

[51] Int. Cl.$^4$ .................................................. B62J 9/00
[52] U.S. Cl. ...................................... 224/32 A; 224/39
[58] Field of Search ............... 7/125; 224/32 R, 32 A, 224/39 R, 31, 30 R

[56] References Cited

U.S. PATENT DOCUMENTS 3,786,972  1/1974  Alley .
3,937,374  2/1976  Hine, Jr. ........................... 224/32 A
4,044,413  8/1977  Tucker ..................................... 7/125

FOREIGN PATENT DOCUMENTS 759958  2/1934  France .
1102369 10/1955 France .
614967 12/1948 United Kingdom ............. 224/32 R Primary Examiner—Stephen Marcus
Assistant Examiner—David Voorhees
Attorney, Agent, or Firm—O'Rourke & Harris

[57] ABSTRACT

A securing device is disclosed for the attachment of an assembly, such as a pannier bag, to a structure, such as a bicycle frame. The device includes a clamping member formed by a supporting engagement member and a lever member that exerts clamping pressure in a direction toward the supporting engagement member. The supporting engagement member and the lever member are mounted on a stiff wall with the lever member including a lever arm that is pivotally mounted on the stiff wall so that a compressible bumper is brought into engagement with structure being clamped to establish the engaged position. An adjustable locking mechanism is also provided for engaging the lever arm to releasably lock in the engaged position.

12 Claims, 5 Drawing Figures

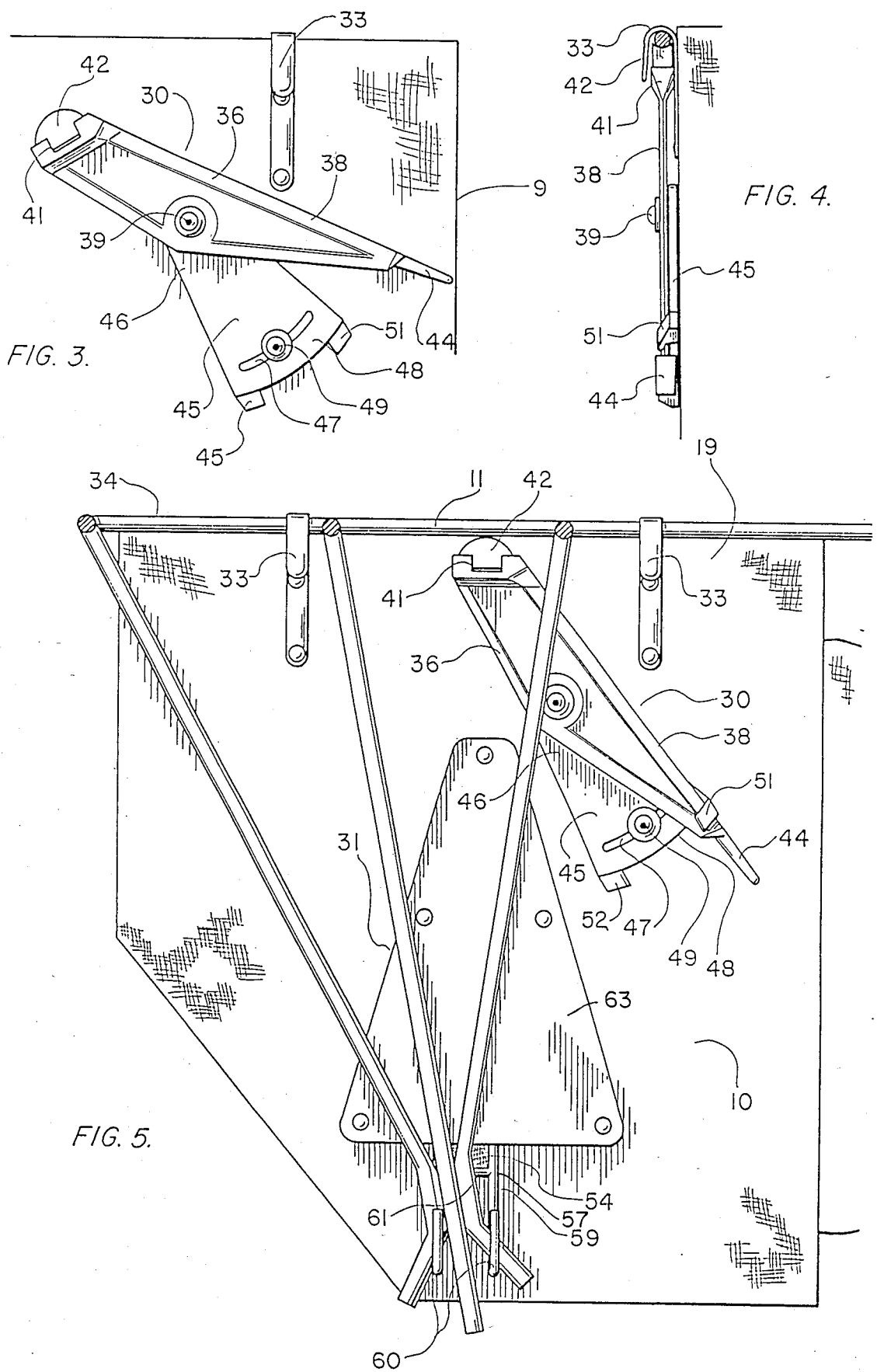

PANNIER BAG HAVING A CLAMPING DEVICE WITH LOCKING MEMBER

FIELD OF THE INVENTION

This invention relates to a device for releasably securing an assembly to a structure, and, more particularly, relates to a releasable securing device for clamping and locking a pannier bag to a bicycle.

BACKGROUND OF THE INVENTION

Securing, or attachment, devices for securing an assembly to a structure are well known and such devices have been developed and/or utilized for securing many different assemblies to diverse structures. In particular, securing devices for securing pannier bags to a bicycle are well known, including attachment devices for attaching pannier bags, either singularly or in pairs, to either the front or the rear of the bicycle. One such arrangement, for example, is described in U.S. Pat. No. 3,786,972, issued Jan. 22, 1974 to Hartley R. Alley. In this arrangement, two hook members at the upper back portion of the pannier bag are hooked to a bicycle carrier above the rear wheel. A spring, having one end connected with the lower portion of the bag and the other end connected to a lower hook, is linearly distended to allow the lower hook to be attached at a lower portion of the carrier adjacent to the hub of the bicycle.

Another such arrangement, again by way of example, is shown in U.S. Pat. No. 3,937,374, issued Feb. 10, 1976 to Edward K. Hine, Jr. one of the joint inventors named herein. This system also utilizes two hook members at the upper back portion of the pannier bag, but has a horizontally positioned spring which extends between spaced attachment means at the central back area of the pannier bag with the springs being distended at its center portion for attachment by means of a lower hook at a lower portion of the carrier adjacent the hub of the bicycle.

Other example of attachment devices are shown by way of example, in French Pat. Nos. 1,102,369 and 759,958.

Thus, while improvements for attachment or securing devices for securing an assembly, such as a pannier bag, to structure, such as a bicycle, have heretofore been suggested and/or utilized, further improvements, upon development, could nevertheless be utilized.

SUMMARY OF THE INVENTION

This invention, provides a releasable securing device that includes a clamping unit utilized in conjunction an adjustable locking unit, with the clamping unit including supporting engagement means positioned upon an assembly (such as a pannier bag) to be secured to a structure (such as a bicycle), and a lever arm having one end moveable toward the supporting engagement means to clamp the structure therebetween, with the lever arm being thereafter releasably locked into the thus established engaged position by the locking unit.

It is therefore an object of the present invention is to provide an improved securing device for securing an assembly to a structure.

It is another object of this invention to provide an improved securing device for securing a pannier bag to a bicycle.

It is still another object of this invention is to provide an improved securing device having a clamping unit.

It is still another object of this invention is to provide an improved securing device having a clamping unit with a lever arm that is locked by means of a locking unit associated therewith.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings, together with the specification, illustrate a complete embodiment of the invention according to the best mode so far devised for the practical application of the principles thereof, and in which:

FIG. 3 is a front view of the device of this invention, mounted on the interior side of the pannier bag as shown in FIG. 2, in an unengaged and unlocked position;

FIG. 4 is a side view of the device of this invention to particularly illustrate the locking member; and FIG. 5 is a front view of the device of this invention mounted on the inner side of a pannier bag and used, in conjunction with a lower attachment device, for clamping the pannier bag to a bicycle frame.

DETAILED DESCRIPTION OF THE INVENTION

Figure 1:
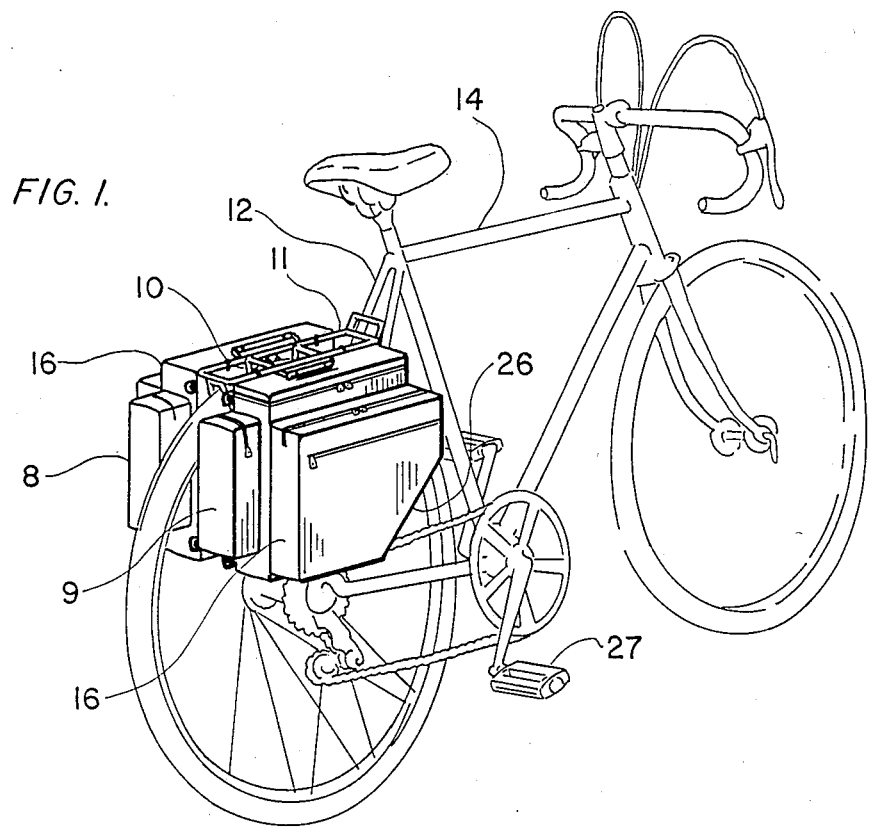
FIG. 1 is a perspective view of a bicycle with a pair of pannier bags secured thereto in accordance with this invention.

Referring now to the drawings, a pair of pannier bags 8 and 9 are shown in FIG. 1, secured by securing device 10 on a mounting rack 11 attached to frame 12 of bicycle 14.

Pannier bags 8 and 9 are constructed of easily deformable structural wall members 16 and normally includes a stiffening member 18 (see FIG. 2) at the back wall 19 (i.e., the inner wall facing the bicycle when mounted thereon) of each bag. Typically, the structural wall members 16 are constructed of a pliable fabric material of substantial strength and may be, for example, nylon or canvass, with the fabric material utilized being preferably water resistant.

Figure 2:
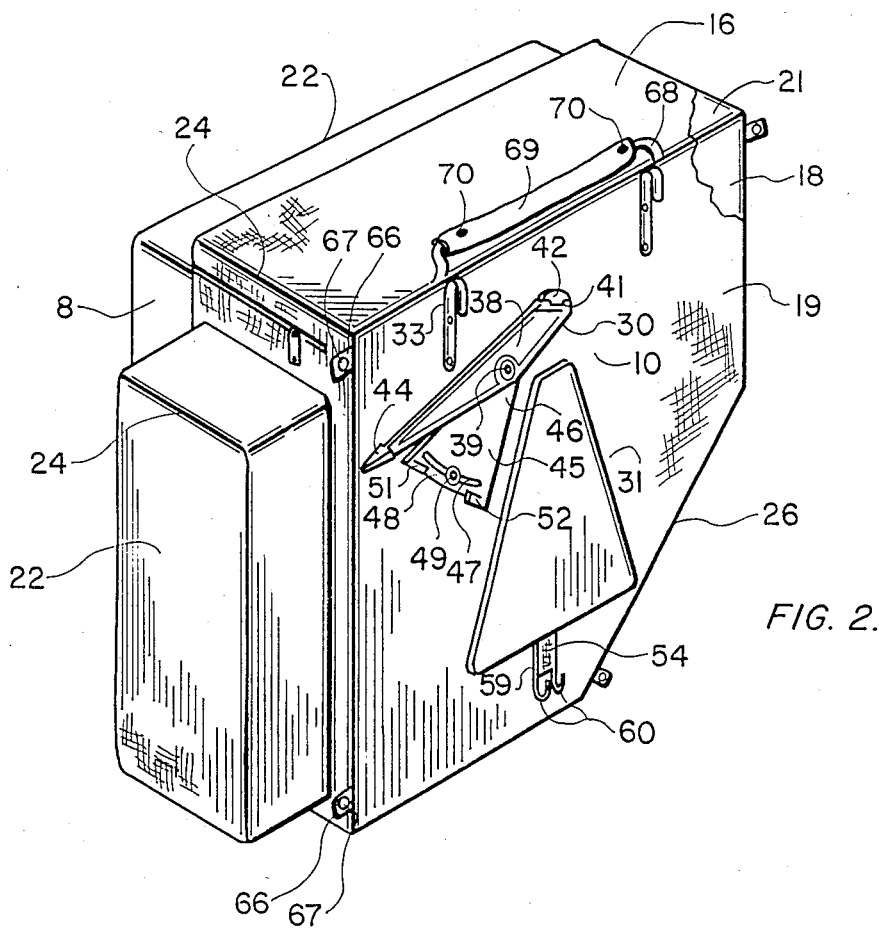
FIG. 2 is a perspective view of a pannier bag, as shown in FIG. 1, illustrating the securing device of this invention mounted thereon.

Pannier bag 8, as illustrated in FIG. 2, includes a main compartment 21, as well as a number of pockets 22 opening to the exterior of the bag through openings which may be closed by zippers 24. As shown by FIG. 1, pannier bags 8 and 9 are usually not identical in shape, but rather, are preferably constructed as mirror images of each other. As indicated in FIGS. 1 and 2, each pannier bag preferably has an angular cut-away portion 26 positioned adjacent to the bicycle pedals 27 to insure the necessary pedal clearance.

If a stiffening member 18 is not provided at the back wall 19 of the bag, a separate stiffening member is provided at the back wall since it is necessary that clamping and locking member 30 and the biasable securing member 31 of securing device 10 be maintained in a fixed spacial relationship with respect to one another for securing purposes. Stiffening member 18 may be constructed of any light, relatively stiff material, such as, for example, a thin sheet of metal or plastic.

Clamping and locking member 30 include a pair of hooks 33 (i.e., support engagement means), the shanks of which are fastened, as by rivets, for example, to stiffening member 18 at the top portion thereof, so that the free ends of the hooks extend outwardly from the top of stiffening member 18 so as to be engageable with horizontal bar 34 of mounting rack 11 (see FIG. 5). The curved bar engaging ends of hooks 33 are preferably coated with a pliable plastic material (or neoprene or rubber) 35, to provide a high friction surface to improve the grip of the hooks on bar 34 and thereby reduce the possibility of slippage of the hooks along the bar.

Hooks 33 act as a support engagement element in conjunction with lever 36 to form clamping member 30. Lever arm 38 of lever 36 is centrally mounted on stiffening member 18 by means of screw 39 which provides a pivot for the lever arm. The upper end of lever arm 38 has a slot 41 therein to receive a disk, or bumper, 42 of compressible material, such as rubber or plastic, to form a high friction surface, with the surface of disk 42 being positioned to engage bar 34 at the side opposite to that of engagement of bar 34 with hooks 33 (see FIG. 5) so that bar 34 is clamped between hooks 33 and disk 42 when the clamping device is in the engaged position as shown in FIGS. 1 and 5. The lower end of lever arm 38 preferably has a finger engageable handle 44 to facilitate moving the lever between the engaged position (as shown in FIGS. 1, 4 and 5) and the unengaged postion (as shown in FIGS. 2 and 3).

Locking plate 45 is positioned between stiffening arm 18 and lever arm 38 and has one end 46 mounted to stiffening member 18 by screw 39 so that the locking plate pivots about screw 39. Locking plate 45 also has an arcuate slot 47 therein at the lower end 48 to receive adjustment screw 49 therein. The limits of the pivotting motion of the locking plate are established by the length of the arcuate slot, and screw 49 is tightened to releasably establish a fixed position of the locking plate.

A pair of outwardly directed lips 51 and 52, the outer edges of which extend toward one another, are provided at end 48 of locking plate 45 with lip 51 being engageable with lever arm 38 just above handle 44 (as shown in FIG. 5) to establish the engaged position of the lever arm. In the engaged position, disk 42 on lever arm 38 is brought into firm contact with bar 34 for clamping purposes, and lever arm 38 is releasably locked in place by lip 51 of locking plate 45. Firm positioning is achieved by adjustment screw 49 which is utilized to adjust locking plate 45 so that lever arm 38, when received within retainer lip 51, brings disk 42 firmly in position against bar 34. To move lever arm 38 to the unengaged position, such as shown in FIGS. 2 and 3, it is necessary to exert pressure on the lever arm to increase the pressure on rod 34 sufficiently, by rotating lever arm 38 in a clockwise direction, to allow the lever arm to clear the curved outer edges of lip 51, after which the arm can then be rotated counter-clockwise to remove the pressure from rod 34.

As is apparent from FIG. 5, the pannier bags are stabilized with respect to mounting rack 11 and hence to bicycle frame 12 by virture of the pressure exerted by lever arm 38 on bar 34 to thereby releasably clamp the bar between disk 42 on lever arm 38 and hooks 33. By this arrangement, stabilization of the pannier bag is clamped between hooks 33 and disk 42 through use of a relatively simple clamping device while still maintaining ease of release of the pannier bag from the bicycle. Additionally, by providing a high friction coating 35 on hooks 33 and providing a disk 42 with a high friction surface, sliding of the bag with respect to the mounting rack and hence the bicycle frame is resisted such that the pannier bag may be positioned and balanced on the bicycle with greater assurance against movement of the pannier bag relative to the frame over rough terrain, or sliding of the pannier bag relative to the frame which might inhibit operations (such as pedalling).

While not part of the invention claimed herein, biasable securing member 31, as shown in FIGS. 2 and 5, includes an elastic strap 54 the ends of which are secured at one end to stiffening member 18, as for example, by a rivet. The middle portion of elastic strap 54 engages hook assembly 57. Hook assembly 57 has an elongated U-shaped configuration with the central portion of the legs providing a dual shaft shank 59 and the end portions of each leg of the shank providing spaced hooks 60 with the hook 60 extending inwardly from stiffening member 18 and the ends of the hooks pointing upwardly. A connecting strip 61 is provided between the legs of the shank at the central portion thereof, and strip 61 receives elastic strap 54 therearound to cause the elastic strap to bias hooks 60 in a direction toward hooks 33 of clamping member 30.

As shown, a restraining plate, or cover, 63 is positioned parallel and closely adjacent to stiffening member 18 with plate 63 being spaced from stiffening member 18 a distance just sufficient to permit shank 59 and strap 54 to be positioned between plate 63 and stiffener member 18 so that the shank is moveable in directions parallel to the plane of stiffening member 18 (i.e., downwardly or sideways when the stiffening member 18 is vertically positioned. This allows the hook to be moved in a direction away from hook 33 to allow securing of the pannier bag on a bicycle, but precludes any appreciable movement of the stiffening member of a pannier bag, when mounted on the bicycle, in a direction away from the frame.

Connecting means may also be provided on pannier bags 8 and 9 to configure a pair of such bags into a unitary piece of luggage. Specifically, as shown in FIG. 2, side strips 66 are attached along the rear, side, top and bottom peripheries of the pannier bags with each strap having one portion of snaps 67 thereon (the male portion being on pannier bag 8 and the female portion being on pannier bag 9, for example). Pannier bags 8 and 9 also have a handle strap 68 thereon which, when joined, extends away from the side surface of the pannier bags to provide a convenient means for carrying the thus formed unitary piece of luggage. A sleeve 69 may be utilized to encircle handle strap 68 and may be secured therearound by snap 70 to provide an even more convenient carrying handle.

Through development as set forth herein, improvements have thus been recently found for securing pannier bags to a bicycle to stabilize the bag by the clamping device of this invention, particularly when utilized with the locking assembly also shown herein. Thus, rough terrain and other oscillations of the bag are precluded from inducing throw-off in normal use, inadvertent release of the bags, or inducing, in normal use, as is inadvertent release of the bags and shifting of the bags on the bicycle frame, which could result in failure of bicycle stability. In addition, the attachment to and release of pannier bags from the bicycle frame is simplified.

The pannier bag securing device of this invention thus provides stable and secure attachment of a pannier bag to a bicycle to thereby stabilize the pannier bag and substantially enhance prevention of inadvertent release of the pannier bag from the bicycle, with clamping of the bag requiring less tension be present between the clamping members when high friction surfaces are utilized, and the biasable, thereby simplifying clamping and locking, as well as unlocking and unclamping and clamp removal.

It should be apparent from the foregoing that this invention provides an improved securing device that it particularly well suited for securing a pannier bag to a bicycle by means of a clamping and locking device.

What is claimed is:

1. A clamping device for securing a pannier bag assembly to a bicycle structure, said device comprising:
    first structure engaging means having one portion mounted on said assembly and a second portion extending from said assembly for engaging structure positioned adjacent to said assembly;
    second structure engaging means;
    lever means mounted on said assembly, said lever means including a lever arm one portion of which has said second structure engaging means thereon, and a second portion for actuating said lever arm to cause movement of said second structure engaging means in a direction to exert a force upon said structure between said first and second engaging means; and
    latching means including, at least in part, stiff wall means extending substantially parallel to the path of travel of said second structure engaging means during said movement of said second structure engaging means in said first direction, with said stiff wall means being positioned adjacent to said second structure engaging means throughout said movement of said second structure engaging means in said first direction, so that, after said movement in said first direction, said stiff wall means acts in conjunction with said lever means to exert a continuing force on said structure between said first and second structure engaging means until said lever arm is actuated to cause said second structure engaging means to be moved in a direction opposite to said first direction to thereby release said force applied while said lever arm was in said force exerting position.

2. The clamping device of claim 1 wherein said latching device is adjustable to allow adjustment of the pressure exerted on said structure by said lever means.

3. The clamping device of claim 1 wherein said second structure engaging means is a bumper formed of high friction material.

4. The clamping device of claim 1 wherein said second portion of said first structure engaging means is coated with a high friction material.

5. A clamping device for securing a pannier bag assembly to a bicycle structure, said assembly comprising:
    support means mounted on said assembly and having a portion extending from said assembly to engage said structure;
    lever means having a second structure engaging means, a fulcrum, and a lever arm, said fulcrum being the mounting point of said lever arm to said assembly so that said lever arm is adapted to cause movement of said second structure engaging means in a first direction for exertion of a force upon said structure by said second structure engaging means while in an engaged position;
    mounting means for mounting said lever arm to said assembly at said fulcrum point; and
    latching means connected with said lever means and adapted to releasably secure the force exerted by said lever means on said structure, said latching means including, at least in part, stiff wall means extending substantially parallel to the path of travel of said second structure engaging means during said movement of said second structure engaging means in said first direction, with said stiff wall means being positioned adjacent to said structure engaging means throughout said movement of said second structure engaging means in said first direction so that, after said movement in said first direction, said stiff wall means acts in conjunction with said lever means to exert a continuing force on said structure between said structure engaging means until said lever means is actuated to cause said second structure engaging means to be moved in a direction opposite to said first direction to thereby release said force applied while said lever arm was in said engaged position.

6. The clamping device of claim 5 wherein said latching means is adjustable with respect to said lever means to allow adjustment of the force exerted by said latching means on said structure.

7. The clamping device of claim 5 wherein the portion of said lever arm which exerts force upon the structure is formed of a high friction material.

8. The clamping device of claim 5 wherein the portion of the support means extending from said assembly is coated with a high friction material.

9. A clamping device for securing a pannier bag, having a back wall member which is stiff relative to other wall members, to a bicycle, said device comprising:
    at least one support means mounted on said back wall member of said pannier bag and having a portion extending from said back wall member for engagement with said bicycle;
    lever means having a fulcrum and lever arm, said fulcrum being the mounting point of said lever arm to said back wall member and said lever arm having a first portion engageable with said bicycle and a second portion adapted for exertion of a force by said lever means on a portion of a bicycle between said support means and said one portion of said lever means to establish an engaged position;
    mounting means for pivotally mounting said lever arm on said back wall member at said fulcrum; and
    latching means mounted on said back wall member and engageable with said second portion of said lever means, said latching means including releasable positioning means for releasably maintaining the engaged position of said lever means during which said lever means releasably clamps said portion of said bicycle between said support means and said first portion of said lever means to thereby substantially secure said pannier bag on said bicycle.

10. The clamping device of claim 9 wherein said latching means includes adjusting means for varying the force exerted by said lever means on said bicycle when in said engaged position.

11. The clamping device of claim 9 wherein said first portion of said lever arm is formed of a high friction material.

12. The clamping device of claim 9 wherein said portion of said support means extending from said assembly is coated with a high friction material.

* * * * *